United States Patent [19]
Fulton

[11] 3,756,642
[45] Sept. 4, 1973

[54] SECURING DEVICE
[76] Inventor: Robert L. Fulton, 10063 Jefferey Drive, St. Louis County, Mo. 63137
[22] Filed: May 14, 1971
[21] Appl. No.: 143,435

[52] U.S. Cl.............. 292/341.15, 70/1.5, 292/346
[51] Int. Cl............................................. E05c 11/00
[58] Field of Search.................. 70/416, 418, 118, 70/120, 1.5; 292/346, 341.15

[56] References Cited
UNITED STATES PATENTS
2,672,745  3/1954  Marchetti................. 292/340 X
685,188  10/1901  Taylor....................... 292/346 X
359,183  3/1887  Sherwood................... 292/346
2,073,149  3/1937  Geyer........................ 70/464 X Primary Examiner—Richard E. Moore
Attorney—Roger M. Hibbits

[57] ABSTRACT

The present invention relates to a securing device wherein a conventional lock bolt actuates a linkage which causes securing bolts to extend from the door frame and engage the door.

2 Claims, 4 Drawing Figures

PATENTED SEP 4 1973                    3,756,642

INVENTOR
ROBERT L. FULTON
BY Roger M. Hibbits
ATTORNEY

SECURING DEVICE

BACKGROUND OF THE INVENTION

Conventional latching devices provided with a single lock bolt may be defeated by using a prying member such that said bolt is caused to be moved out of the lock bolt chamber. An improvement of such device is provided wherein the lock bolt upon entry into the bolt chamber actuates a reversing mechanism which causes securing bolts to emerge from the door frame and engage the door. However, the problem remains that if the lock bolt is forcibly withdrawn the securing bolts are also withdrawn.

SUMMARY OF THE INVENTION

The present invention provides a securing device whereby a conventional lock bolt causes securing bolts to engage the door and where further, the lock bolt and securing bolts are provided with sleeves which collapse and prevent movement of the bolts in the event of tampering.

It is therefore an object of the present invention to provide a securing device which has a lock bolt which actuates securing bolts upon entry into the bolt chamber.

A further object of the present invention is to provide such a device which will maintain the securing bolts in engaged relationship if the securing bolt is forcibly withdrawn.

A further object of the present invention is to provide such a device which is simply and economically manufactured and used.

These together with other objects and advantages, which will become subsequently apparent, reside in the details and construction and operation as more fully hereinafter described and claimed, reference being had to the accompanying drawings forming a part hereof, wherein like numerals refer to like parts throughout, and in which;

DETAILED DESCRIPTION OF THE INVENTION

Figure 1:
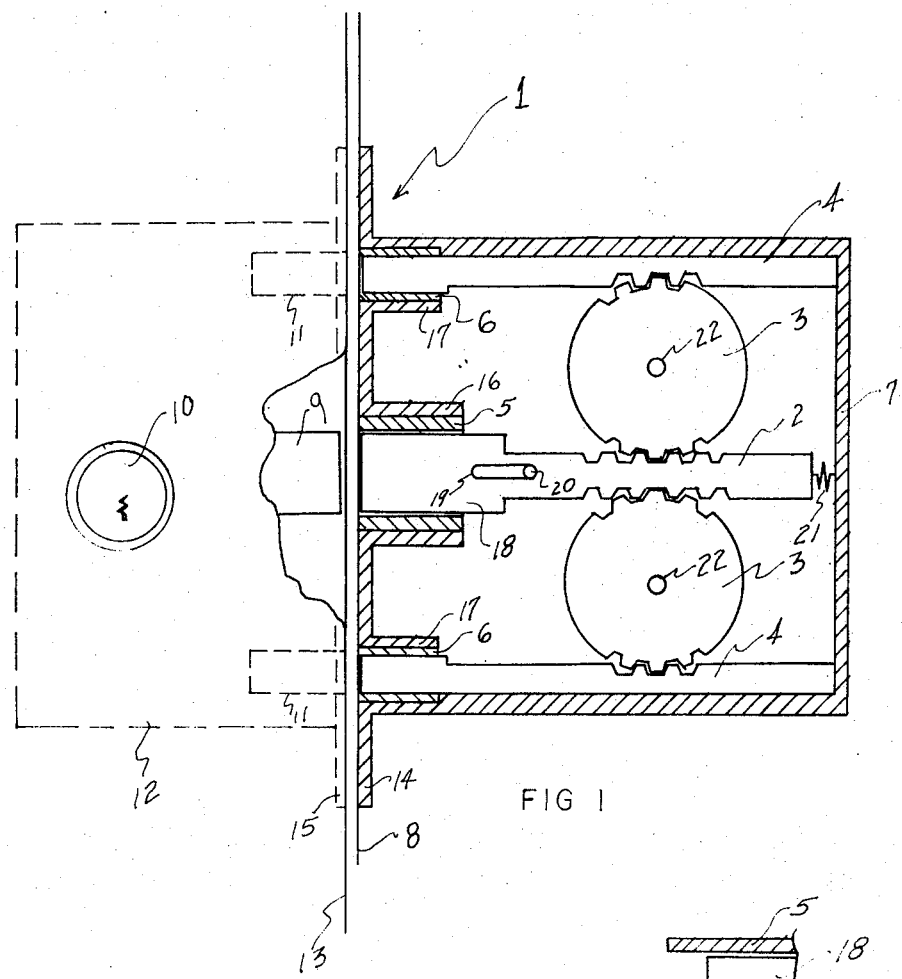
FIG. 1 is an elevational sectional view of a securing device constructed in accordance with, used in and embodying the present invention.

Referring now in more detail and by reference characters to the drawings which illustrate practical embodiments of the present invention, FIG. 1, is a elevational sectional view of a securing device, 1, constructed in accordance with, used in and embodying the present invention.

As shown in FIG. 1 part of securing device, 1, comprises rack member, 2, gears, 3, securing bolts, 4, and securing sleeves, 5, and, 6, mounted within a suitable housing, 7, which is installed in a door jam, 8. The remaining portion of securing device, 1, comprises lock bolt, 9, locking mechanism, 10, and securing bolt chambers, 11, operably mounted in housing, 12, which is installed in door, 13.

Housings, 7, and, 12, are provided with face plates, 14, and, 15, respectively which facilitate mounting to door jam, 8, and door, 13. Faceplates, 14, and, 15, may be secured to the door jam by conventional means such as woodscrews or the like.

As shown in FIG. 1, faceplate, 4, is constructed such that flanges, 16, and, 17, are provided about rack member, 2, and securing bolts, 4, respectively. Flanges, 16, and, 17, are provided to support their associated member during its traverse.

As shown in FIG. 1, locking mechanism, 10, may be any conventional locking mechanism which actuates a bolt like member such as lock bolt, 9. In operation the present device functions such that when locking mechanism, 10, is activated, lock bolt, 9, moves to the right in FIG. 1, causing it to engage with the bolt portion, 18, of rack member, 2, causing it to move to the right which causes gears, 3, to rotate which in turn actuates securing bolts, 4, causing them to move out of housing, 7, and into corresponding securing bolt chambers, 11, provided in housing, 12.

As shown in the drawing rack member, 2, is provided with slot, 19, in which bolt, 20, mounted to casing, 7, rides. Bolt, 20, in slot, 19, in cooperation with spring, 21, keeps rack member to the left in casing, 7, until it is caused to move to the right by lock bolt, 9. Gears, 3, are rotatably mounted to housing, 7, using conventional means, 22.

Figure 2:
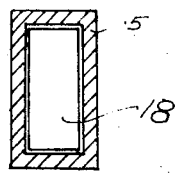
FIG. 2 is a partial cross-section view of the device shown in FIG. 1.
Figure 3:
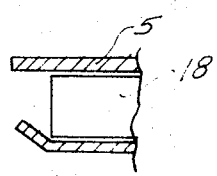
FIG. 3 is a partial cross-section view of the device shown in FIG. 1 after tampering has occurred.

A primary feature of the present invention resides in the use of sleeves, 5, and, 6. Without the sleeves, 5, and, 6, the device described may be pried open by forcing bolt, 9, out of casing, 7, with some type (burglar) of prying tool and thus cause rack member, 2, to move to the left and securing bolts, 4, to withdraw from the door allowing the door to be opened. However, in the present invention, sleeve, 5, constructed of a flexible metal surrounds bolt portion, 18, of rack member, 2, as shown in FIG. 2, such that when rack member, 2, is moved to the right and a prying tool is used, sleeve, 5, will collapse as shown in FIG. 3. If a burglar should succeed in prying lock bolt, 9, out of casing, 7, the collapse of sleeve, 5, prevents rack member, 2, from moving to the left and thus securing bolts, 4, are undisturbed and remain in securing bolt chambers, 11, thus preventing opening the door.

Figure 4:
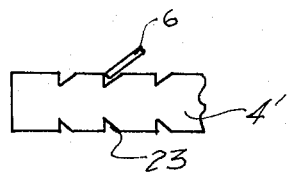
FIG. 4 is a partial cross-section view of the device shown in FIG. 1.

An additional safety feature resides in the use of sleeves, 6, surrounding securing bolt, 4, which are provided with indentations, 23, illustrated in FIG. 4. In the event an attempt is made to pry securing bolts, 4, it will cause sleeves, 6, to collapse and engage indentations, 23, and prevent withdrawal of securing bolts, 4, from door, 13.

It should be understood that changes and modifications in the form, construction, arrangement, and combination of the securing device and methods of making and using the same may be made and substituted for those herein shown and described without departing from the nature and principle of my invention.

Having thus described my invention, what I claim is new and desire to secure by United States Letters Patent is:

1. A securing device which is an improvement of conventional door latching devices comprising, first housing means, said first housing means adapted to fit into the free edge of a hinged door and provided with an actuated lock bolt, said first housing means also provided with securing bolt chambers exposed to the aforesaid door edge, and second housing means, said second housing means, provided with bolt acceptance means and operably mounted to the door frame corresponding to the aforesaid first housing means such that the aforementioned actuated lock bolt is aligned with said bolt acceptance means, securing bolt actuating means operably mounted in said bolt acceptance means.

securing bolt means operably coupled to said securing bolt actuating means such that when the aforementioned actuated lock bolt enters the bolt acceptance means this activates the securing bolt activating means which causes a plurality of securing bolts to emerge from said second housing means and enter and engage the securing bolt chambers in said first housing means, and readily collapsible sleeve means operably mounted within said bolt acceptance means and disposed so that upon application of lateral pressure to the door edge end of said sleeve means, said sleeve means collapses and prevents retraction of said securing bolt actuating means.

2. A securing device which is an improvement of conventional door latching devices comprising, first housing means, said first housing means adapted to fit into the free edge of a hinged door and provided with an actuated lock bolt, said first housing means also provided with securing bolt chambers exposed to the aforesaid door edge, and second housing means, said second housing means, provided with bolt acceptance means and operably mounted to the door frame corresponding to the aforesaid first housing means such that the aforementioned actuated lock bolt is aligned with said bolt acceptance means, securing bolt actuating means operably mounted in said bolt acceptance means, securing bolt means, provided with a plurality of recesses along the lateral surface thereof, operably coupled to said securing bolt actuating means such that when the aforementioned actuated lock bolt enters the bolt acceptance means this activates the securing bolt actuating means which causes a plurality of securing bolts to emerge from said second housing means and enter and engage the securing bolt chambers in said first housing means, readily collapsible sleeve means operably mounted within said bolt acceptance means, and disposed so that upon application of lateral pressure to the door edge end of said sleeve means, said sleeve means collapses and prevents retraction of said securing bolt actuating means, readily collapsible sleeve means operably mounted about said securing bolt means and disposed so that upon application of lateral pressure to the door edge end of said sleeve means said sleeve means collapse and engage the recesses in said securing bolts preventing retraction of said securing bolts.

\* \* \* \* \*